(12) United States Patent
Glussich

(10) Patent No.: US 6,374,778 B1
(45) Date of Patent: Apr. 23, 2002

(54) PET COLLAR AND IDENTIFICATION ASSEMBLY

(76) Inventor: Deirdre Glussich, 5213 Ave. L, Brooklyn, NY (US) 11234

( * ) Notice: Subject to any disclaimer, the term of this patent is extended or adjusted under 35 U.S.C. 154(b) by 0 days.

(21) Appl. No.: 09/675,185

(22) Filed: Sep. 29, 2000

(51) Int. Cl.[7] .............................................. A62B 35/00
(52) U.S. Cl. ...................................... 119/859; 119/863
(58) Field of Search ................................ 119/863, 865, 119/856, 858, 859, 792

(56) References Cited

U.S. PATENT DOCUMENTS

| | | | | |
|---|---|---|---|---|
| 1,800,421 A | * | 4/1931 | Wickersham et al. ........ | 119/863 |
| 4,530,309 A | * | 7/1985 | Collins ........................ | 119/863 |
| 4,967,696 A | | 11/1990 | Tobias ......................... | 119/720 |
| 5,046,456 A | | 9/1991 | Heyman et al. ............. | 119/356 |
| 5,355,839 A | | 10/1994 | Mistry ......................... | 119/858 |
| 5,515,033 A | | 5/1996 | Matarazzo ................... | 119/859 |
| 5,523,927 A | | 6/1996 | Gokey ......................... | 119/859 |
| D377,245 S | | 1/1997 | Norman et al. ............. | D30/152 |
| 5,690,059 A | * | 11/1997 | Woods ......................... | 199/863 |
| 5,815,077 A | | 9/1998 | Christiansen ............... | 119/720 |
| 6,067,018 A | * | 5/2000 | Skelton et al. .............. | 119/859 |
| 6,205,956 B1 | * | 3/2001 | Dickie et al. ................ | 119/863 |

* cited by examiner

Primary Examiner—Charles T. Jordan
Assistant Examiner—Elizabeth A Shaw

(57) ABSTRACT

A pet collar and identification assembly for easily locating a pet which has broken away from the owner. The pet collar and identification assembly includes a first collar assembly including a first collar member having first and second ends, and also including fasteners being attached to the first and second ends thereof, and further including a size adjustment buckle being mounted to the first collar member; and also includes a linkage assembly including a linkage member having first and second ends and being connected to the first collar member; and further includes a second collar assembly including a second collar member having first and second ends and being connected to the linkage member, and also including fasteners being attached to the first and second ends of the second collar member; and also includes an identification and alarm unit being mounted to the second collar member; and further includes a leash assembly including a leash member having first and second ends and being connected to the linkage member, and also including an eyelet being attached at the first end of the leash member; and also includes connectors for interconnecting the first and second collar members, the leash member and the linkage member.

13 Claims, 4 Drawing Sheets

PET COLLAR AND IDENTIFICATION ASSEMBLY

BACKGROUND OF THE INVENTION

1. Field of the Invention

The present invention relates to an alarm and identification pet collar and more particularly pertains to a new pet collar and identification assembly for easily locating a pet which has broken away from the owner.

2. Description of the Prior Art

The use of an alarm and identification pet collar is known in the prior art. More specifically, an alarm and identification pet collar heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 5,515,033; U.S. Pat. No. 5,523,927; U.S. Pat. No. 5,046,456; U.S. Pat. No. 5,355,839; U.S. Pat. No. 5,815,077; U.S. Pat. No. Des. 377,245; and U.S. Pat. No. 4,967,696.

While these devices fulfill their respective, particular objectives and requirements, the aforementioned patents do not disclose a new pet collar and identification assembly. The inventive device includes a first collar assembly including a first collar member having first and second ends, and also including fasteners being attached to the first and second ends thereof, and further including a size adjustment buckle being mounted to the first collar member; and also includes a linkage assembly including a linkage member having first and second ends and being connected to the first collar member; and further includes a second collar assembly including a second collar member having first and second ends and being connected to the linkage member, and also including fasteners being attached to the first and second ends of the second collar member; and also includes an identification and alarm unit being mounted to the second collar member; and further includes a leash assembly including a leash member having first and second ends and being connected to the linkage member, and also including an eyelet being attached at the first end of the leash member; and also includes connectors for interconnecting the first and second collar members, the leash member and the linkage member.

In these respects, the pet collar and identification assembly according to the present invention substantially departs from the conventional concepts and designs of the prior art, and in so doing provides an apparatus primarily developed for the purpose of easily locating a pet which has broken away from the owner.

SUMMARY OF THE INVENTION

In view of the foregoing disadvantages inherent in the known types of alarm and identification pet collar now present in the prior art, the present invention provides a new pet collar and identification assembly construction wherein the same can be utilized for easily locating a pet which has broken away from the owner.

The general purpose of the present invention, which will be described subsequently in greater detail, is to provide a new pet collar and identification assembly which has many of the advantages of the alarm and identification pet collar mentioned heretofore and many novel features that result in a new pet collar and identification assembly which is not anticipated, rendered obvious, suggested, or even implied by any of the prior art alarm and identification pet collar, either alone or in any combination thereof.

To attain this, the present invention generally comprises a first collar assembly including a first collar member having first and second ends, and also including fasteners being attached to the first and second ends thereof, and further including a size adjustment buckle being mounted to the first collar member; and also includes a linkage assembly including a linkage member having first and second ends and being connected to the first collar member; and further includes a second collar assembly including a second collar member having first and second ends and being connected to the linkage member, and also including fasteners being attached to the first and second ends of the second collar member; and also includes an identification and alarm unit being mounted to the second collar member; and further includes a leash assembly including a leash member having first and second ends and being connected to the linkage member, and also including an eyelet being attached at the first end of the leash member; and also includes connectors for interconnecting the first and second collar members, the leash member and the linkage member.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new pet collar and identification assembly which has many of the advantages of the alarm and identification pet collar mentioned heretofore and many novel features that result in a new pet collar and identification assembly which is not anticipated, rendered obvious, suggested, or even implied by any of the prior art alarm and identification pet collar, either alone or in any combination thereof.

It is another object of the present invention to provide a new pet collar and identification assembly which may be easily and efficiently manufactured and marketed.

It is a further object of the present invention to provide a new pet collar and identification assembly which is of a durable and reliable construction.

An even further object of the present invention is to provide a new pet collar and identification assembly which is susceptible of a low cost of manufacture with regard to both materials and labor, and which accordingly is then susceptible of low prices of sale to the consuming public, thereby making such pet collar and identification assembly economically available to the buying public.

Still yet another object of the present invention is to provide a new pet collar and identification assembly which provides in the apparatuses and methods of the prior art some of the advantages thereof, while simultaneously overcoming some of the disadvantages normally associated therewith.

Still another object of the present invention is to provide a new pet collar and identification assembly for easily locating a pet which has broken away from the owner.

Yet another object of the present invention is to provide a new pet collar and identification assembly which includes a first collar assembly including a first collar member having first and second ends, and also including fasteners being attached to the first and second ends thereof, and further including a size adjustment buckle being mounted to the first collar member; and also includes a linkage assembly including a linkage member having first and second ends and being connected to the first collar member; and further includes a second collar assembly including a second collar member having first and second ends and being connected to the linkage member, and also including fasteners being attached to the first and second ends of the second collar member; and also includes an identification and alarm unit being mounted to the second collar member; and further includes a leash assembly including a leash member having first and second ends and being connected to the linkage member, and also including an eyelet being attached at the first end of the leash member; and also includes connectors for interconnecting the first and second collar members, the leash member and the linkage member.

Still yet another object of the present invention is to provide a new pet collar and identification assembly that is easy and convenient to place about the neck of a pet.

Even still another object of the present invention is to provide a new pet collar and identification assembly that immediately emits an alarm upon the pet breaking away from its leash member.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
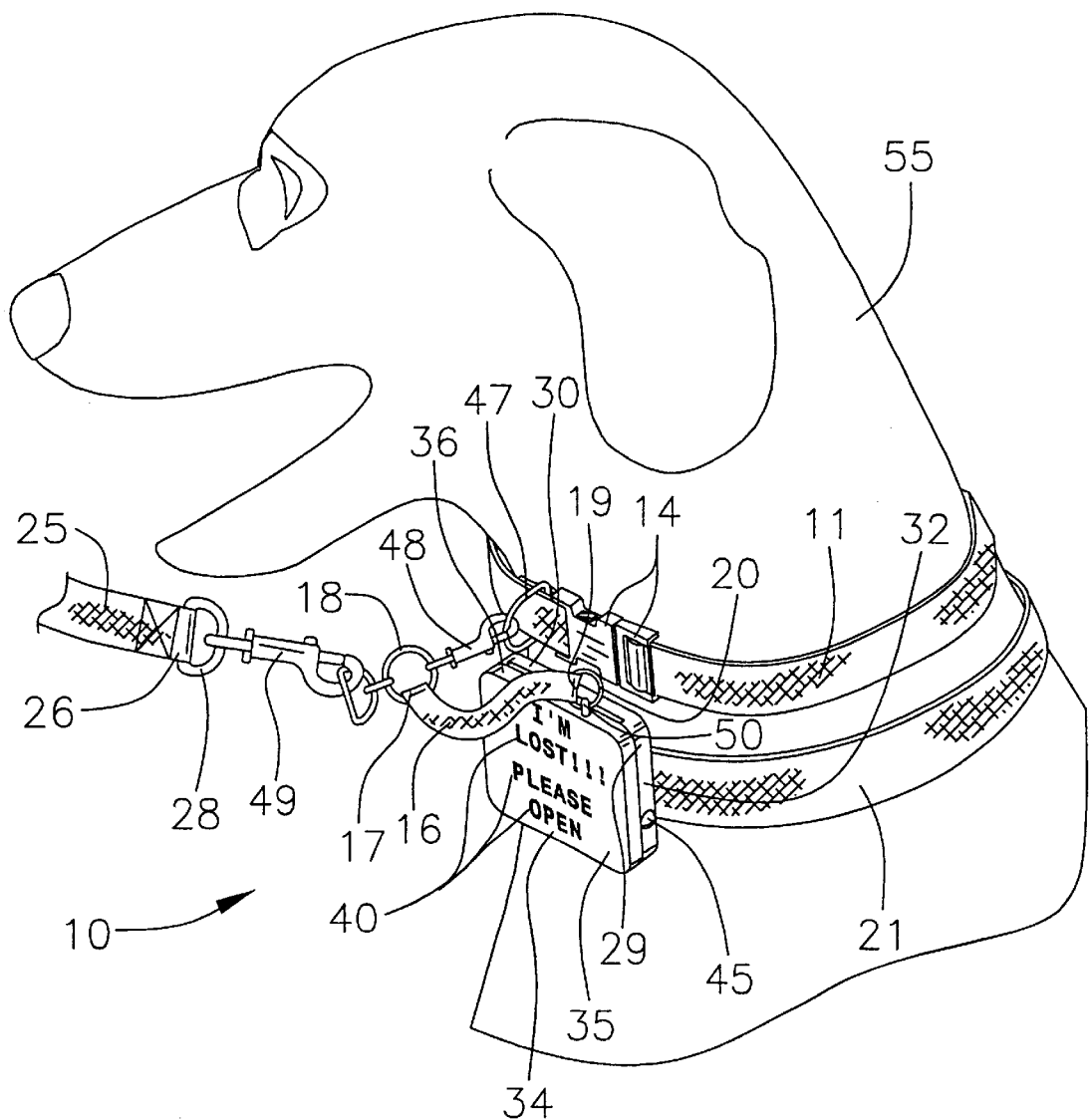
FIG. 1 is a perspective view of a new pet collar and identification assembly according to the present invention and shown in use.
Figure 2:
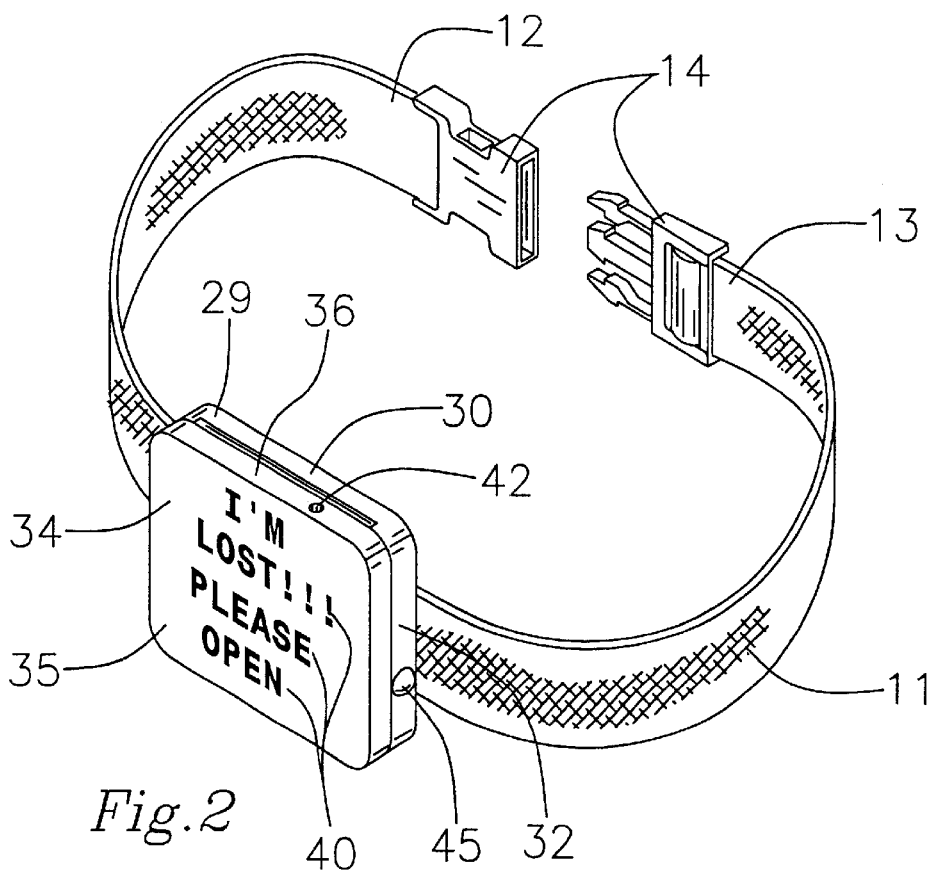
FIG. 2 is a perspective view of the second collar assembly of the present invention.
Figure 3:
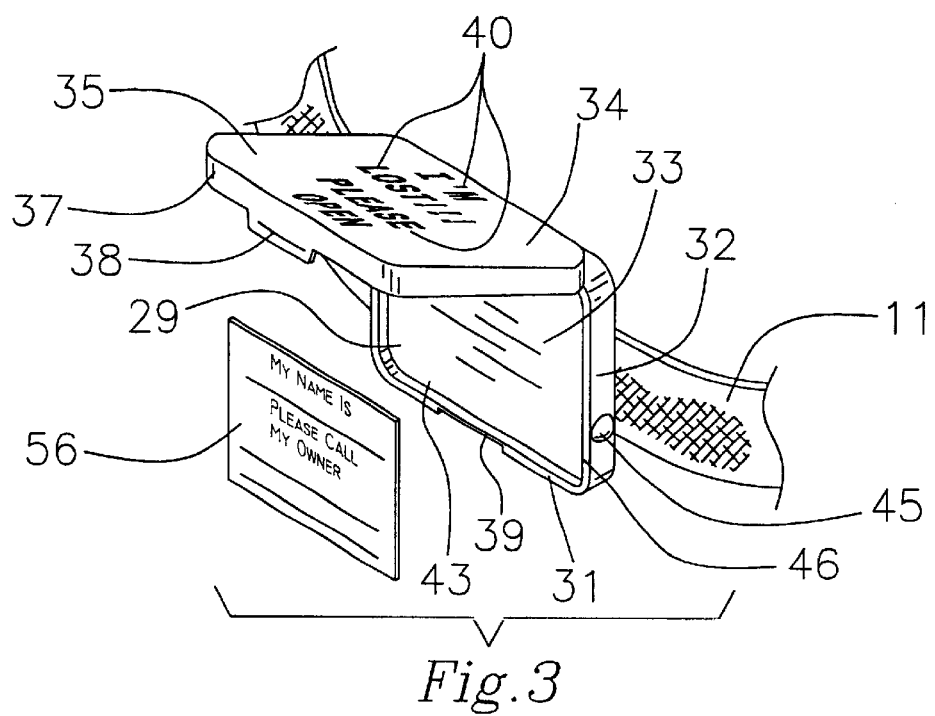
FIG. 3 is a detailed perspective view of the identification and alarm unit of the present invention.
Figure 4:
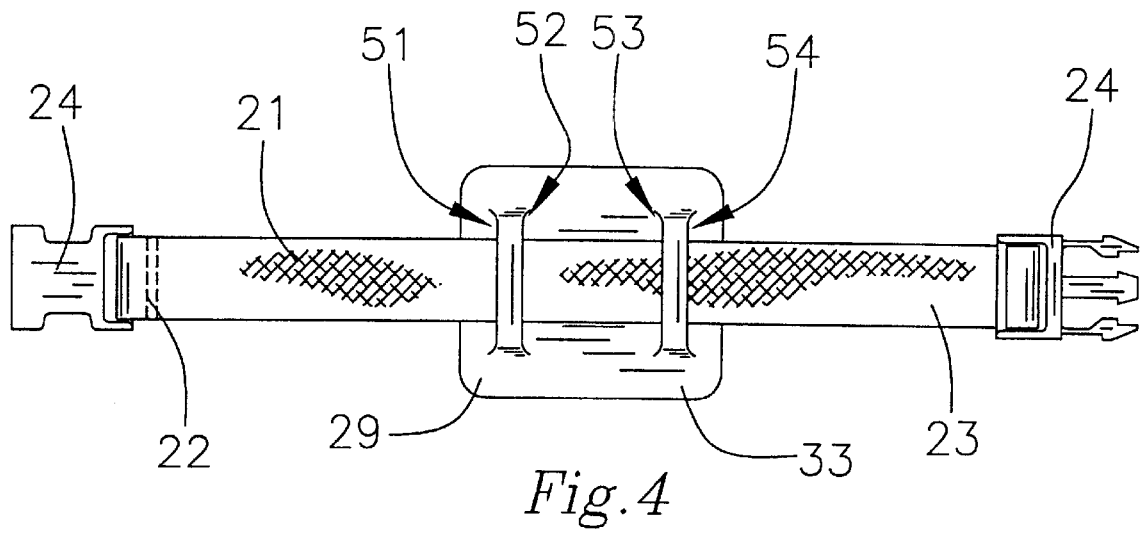
FIG. 4 is a rear elevational view of the second collar assembly of the present invention.
Figure 5:
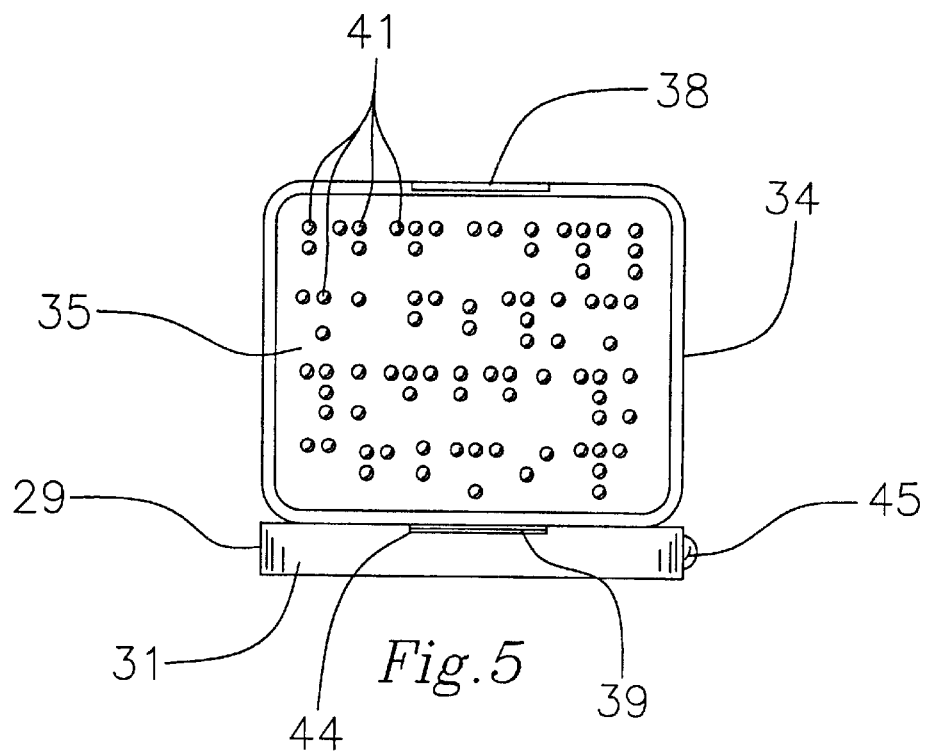
FIG. 5 is a bottom plan view of the lid of the identification and alarm unit of the present invention.
Figure 6:
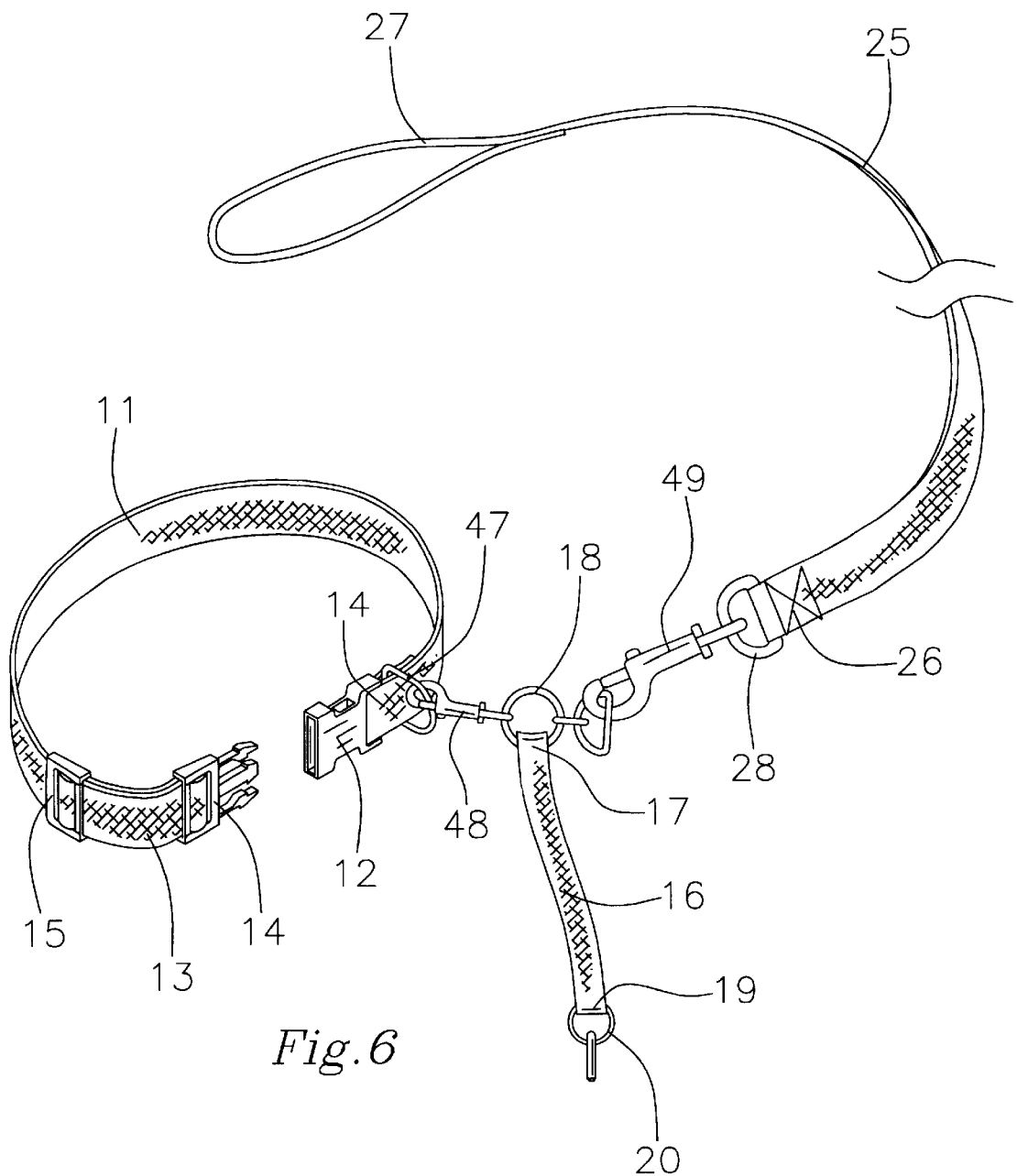
FIG. 6 is a perspective view of the first and second collar assemblies of the present invention.

With reference now to the drawings, and in particular to FIGS. 1 through 6 thereof, a new pet collar and identification assembly embodying the principles and concepts of the present invention and generally designated by the reference numeral 10 will be described.

As best illustrated in FIGS. 1 through 6, the pet collar and identification assembly 10 generally comprises a first collar assembly including a first collar member 11 having first and second ends 12,13, and also including fasteners 14 being conventionally attached to the first and second ends 12,13, and further including a size adjustment buckle 15 being conventionally mounted to the first collar member 11.

A linkage assembly includes a linkage member 16 having first and second ends 17,19 and being conventionally connected to the first collar member 11. The linkage assembly further includes a first ring member 18 being securely and conventionally connected at the first end 17 thereof, and also includes a second ring member 20 being securely and conventionally connected at the second end 19 thereof.

A second collar assembly includes a second collar member 21 having first and second ends 22,23 and being conventionally connected to the linkage member 16, and also includes fasteners 24 being conventionally attached to the first and second ends 22,23 of the second collar member 21.

An identification and alarm unit is conventionally mounted to the second collar member 21. The identification and alarm unit includes a container 29 having an open front, side and end walls 30–32, and a back wall 33, and also includes a lid 34 having a first edge 36 which is hingedly attached to one of the side walls 30 of the container 29, and further includes a latch 38 being securely and conventionally attached to a second edge 37 of the lid 34, and also includes a catch 39 being securely and conventionally attached to one of the side walls 31 of the container 29. The identification and alarm unit further includes an information card 56 being removably stored in the container 29, and also includes an alarm switch 42 being conventionally disposed in one of the walls 30 of the container 29, and further includes an alarm sounding mechanism 43 being securely and conventionally disposed in the container 29 and being conventionally connected to the alarm switch 42, and also includes a light-emitting member 45 being conventionally disposed in one of the walls of the container 29 and being conventionally connected to the alarm switch 42, and further includes a speaker 46 being conventionally disposed in the container 29 and being conventionally connected to the alarm sounding mechanism 43, and also includes batteries 44 being removably disposed in the container 29 and being conventionally connected to the alarm switch 42. The lid 34 includes a main wall 35 having information displayed in Braille 41 being disposed upon an underside of the main wall 35 of the lid 34, and also includes words 40 as to the pet 55 being lost imprinted upon an outer side of the main wall 35 of the lid 34 with the container 29 measuring approximately 2 inches square and having pairs of slots 51-54 disposed through the back wall 33 thereof and being adapted to receive the second collar member 21 for mounting the container 29 to the second collar member 21.

A leash assembly includes a leash member 25 having first and second ends 26,27 and being conventionally connected to the linkage member 16, and also includes an eyelet 28 being conventionally attached at the first end 26 of the leash member 25. The second end 27 of the leash member 25 terminates in a loop for grasping by a user. Connectors for interconnecting the first and second collar members 11,21, the leash member 25 and the linkage member 16 include a connector pin 50 being removably disposed in one of the side walls 30 of the container 29 and being conventionally connected to the alarm switch 42 and being securely and conventionally connected to the second ring member 20 of the linkage assembly, and also include a ring member 47 being securely and conventionally connected to the first collar member 11, and further include a first locking hook member 48 being securely and conventionally connected to the first ring member 18 of the linkage assembly and being removably connected to the ring member 47 of the connectors, and also include a second locking hook member 49 being securely and conventionally connected to the eyelet 28 of the leash assembly and being removably connected to the first ring member 18 of the linkage assembly. The connector pin 50 is adapted to disconnect the alarm switch 42 from the batteries 44 upon the connector pin 50 being disposed in the container 29, and is also adapted to connect the alarm switch 42 to the batteries 44 upon the connector pin 50 being removed from the container 29.

In use, if the pet 55 breaks away from its leash member 25, the connector pin 50 will be removed from container 29 and the alarm switch 42 will be connected to the batteries 44 and will energize the alarm sounding mechanism 43 and the light-emitting member 45 to alert people coming into contact with the pet 55 that the pet 55 is lost.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A pet collar and identification assembly comprising:
    a first collar assembly including:
        a first collar member having first and second ends, fasteners being attached to said first and second ends, and
        a size adjustment buckle being mounted to said first collar member;
    a linkage assembly including a linkage member having first and second ends and being connected to said first collar member;
    a second collar assembly including:
        a second collar member having first and second ends and being connected to said linkage member, and
        fasteners being attached to said first and second ends of said second collar member;
    an identification and alarm unit being mounted to said second collar member;
    a leash assembly including:
        a leash member having first and second ends and being connected to said linkage member, and
        an eyelet being attached at said first end of said leash member; and
    connectors for interconnecting said first and second collar members, said leash member and said linkage member;
    wherein said identification and alarm unit includes:
        a container having an open front; and
        a lid hingedly attached to said container;
        a latch for releasably securing said lid in a closed position on said container; and
        pairs of slots being disposed through said back wall of said container and being adapted to receive said second collar member for mounting said container to said second collar member.

2. A pet collar and identification assembly as described in claim 1, wherein said linkage assembly further includes a first ring member being connected at said first end thereof, and also includes a second ring member being connected at said second end thereof.

3. A pet collar and identification assembly as described in claim 2, wherein said connectors include a connector pin being removably disposed in said container and being connected to said alarm switch and being connected to said second ring member of said linkage assembly; and also includes a ring member being connected to said first collar member; and further includes a first locking hook member being connected to said first ring member of said linkage assembly and being removably connected to said ring member of said connectors; and also includes a second locking hook member being connected to said eyelet of said leash assembly and being removably connected to said first ring member of said linkage assembly.

4. A pet collar and identification assembly as described in claim 3, wherein said connector pin is adapted to disconnect said alarm switch from said at least one battery upon said connector pin being disposed in said container, and is adapted to connect said alarm switch to said at least one battery upon said connector pin being removed from said container.

5. A pet collar and identification assembly as described in claim 1, wherein said identification and alarm unit further includes an information card being removably stored in said container, an alarm switch being disposed in said container, an alarm sounding mechanism being disposed in said container and being connected to said alarm switch, a light-emitting member being disposed in said container and being connected to said alarm switch, a speaker being disposed in said container and being connected to said alarm sounding mechanism; and at least one battery being removably disposed in said container and being connected to said alarm switch.

6. A pet collar and identification assembly as described in claim 2, wherein said second end of said leash member terminates in a loop for grasping by a user.

7. A pet collar and identification assembly comprising:
- a first collar assembly including a first collar member having first and second ends, and also including fasteners being attached to said first and second ends, and further including a size adjustment buckle being mounted to said first collar member;
- a linkage assembly including a linkage member having first and second ends and being connected to said first collar member;
- a second collar assembly including a second collar member having first and second ends and being connected to said linkage member, and also including fasteners being attached to said first and second ends of 3aid second collar member;
- an identification and alarm unit being mounted to said second collar member;
- a leash assembly including a leash member having first and second ends and being connected to said linkage member, and also including an eyelet being attached at said first end of said leash member; and
- connectors for interconnecting said first and second collar members, said leash member and said linkage member;
- wherein said linkage assembly further includes a first ring member being securely connected at said first end thereof, and also includes a second ring member being securely connected at said second end thereof;
- wherein said identification and alarm unit includes a container having an open front, side and end walls, and a back wall; and also includes a lid having a first edge which is hingedly attached to one of said side walls of said container; and further includes a latch being securely attached to a second edge of said lid; and also includes a catch being securely attached to one of said side walls of said container, and also includes pairs of slots being disposed through said back wall of said container and being adapted to receive said second collar member for mounting said container to said second collar member.

8. A pet collar and identification assembly as described in claim 7, wherein said identification and alarm unit further includes an information card being removably stored in said container; and also includes an alarm switch being disposed in one of said walls of said container; and further includes an alarm sounding mechanism being disposed in said container and being connected to said alarm switch; and also includes a light-emitting member being disposed in one of said walls of said container and being connected to said alarm switch; and further includes a speaker being disposed in said container and being connected to said alarm sounding mechanism; and also includes at least one battery being removably disposed in said container and being connected to said alarm switch.

9. A pet collar and identification assembly as described in claim 7, wherein said lid includes a main wall having information displayed in Braille and being disposed upon an underside of said main wall of said lid, and also includes words indicating the pet being lost with said words being imprinted upon an outer side of said main wall of said lid.

10. A pet collar and identification assembly as described in claim 7, wherein said second end of said leash member terminates in a loop for grasping by a user.

11. A pet collar and identification assembly as described in claim 7, wherein said connectors include a connector pin being removably disposed in one of said side walls of said container and being connected to said alarm switch and being connected to said second ring member of said linkage assembly; and also includes a ring member being connected to said first collar member; and further includes a first locking hook member being connected to said first ring member of said linkage assembly and being removably connected to said ring member of said connectors; and also includes a second locking hook member being connected to said eyelet of said leash assembly and being removably connected to said first ring member of said linkage assembly.

12. A pet collar and identification assembly as described in claim 11, wherein said connector pin is adapted to disconnect said alarm switch from said at least one battery upon said connector pin being disposed in said container, and is adapted to connect said alarm switch to said at least one battery upon said connector pin being removed from said container.

13. A pet collar and identification assembly comprising:
- a first collar assembly including a first collar member having first and second ends, and also including fasteners being attached to said first and second ends, and further including a size adjustment buckle being mounted to said first collar member;
- a linkage assembly including a linkage member having first and second ends and being connected to said first collar member, said linkage assembly further including a first ring member being securely connected at said first end thereof, and also including a second ring member being securely connected at said second end thereof;
- a second collar assembly including a second collar member having first and second ends and being connected to said linkage member, and also including fasteners being attached to said first and second ends of said second collar member;
- an identification and alarm unit being mounted to said second collar member, said identification and alarm unit including a container having an open front, side and end walls, and a back wall, and also including a lid having a first edge which is hingedly attached to one of said side walls of said container, and further including a latch being securely attached to a second edge of said lid, and also including a catch being securely attached to one of said side walls of said container, said identification and alarm unit further including an information card being removably stored in said container, and also including an alarm switch being disposed in one of said walls of said container, and further including an alarm sounding mechanism being securely disposed in said container and being connected to said alarm switch, and also including a light-emitting member being disposed in one of said walls of said container and being connected to said alarm switch, and further including a speaker being disposed in said container and being connected to said alarm sounding mechanism, and also including at least one battery being removably disposed in said container and being connected to said alarm switch, and further including pairs of slots being disposed through said back wall of said container and being adapted to receive said second collar member for mounting said container to said second collar member, said lid including a main wall having information displayed in Braille disposed upon an underside of said main wall of said lid, and also including words indicating the pet being lost and being imprinted upon an outer side of said main wall of said lid, said container measuring approximately 2 inches square;

a leash assembly including a leash member having first and second ends and being connected to said linkage member, and also including an eyelet being attached at said first end of said leash member, said second end of said leash member terminating in a loop for grasping by a user; and connectors for interconnecting said first and second collar members, said leash member and said linkage member, said connectors including a connector pin being removably disposed in one of said side walls of said container and being connected to said alarm switch and being securely connected to said second ring member of said linkage assembly, and also including a ring member being securely connected to said first collar member, and further including a first locking hook member being securely connected to said first ring member of said linkage assembly and being removably connected to said ring member of said connectors, and also including a second locking hook member being securely connected to said eyelet of said leash assembly and being removably connected to said first ring member of said linkage assembly, said connector pin being adapted to disconnect said alarm switch from said at least one battery upon said connector pin being disposed in said container, and being adapted to connect said alarm switch to said at least one battery upon said connector pin being removed from said container.

* * * * *